(12) United States Patent
Robertson

(10) Patent No.: US 7,815,237 B2
(45) Date of Patent: Oct. 19, 2010

(54) COVERS FOR VEHICLE INSTRUMENT PANELS

(75) Inventor: Winston Robertson, Richmond (AU)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 227 days.

(21) Appl. No.: 11/971,317

(22) Filed: Jan. 9, 2008

(65) Prior Publication Data

US 2009/0174204 A1 Jul. 9, 2009

(51) Int. Cl.
*B62D 25/14* (2006.01)

(52) U.S. Cl. .......................... 296/70; 248/27.3
(58) Field of Classification Search .............. 180/90; 181/199; 248/27.3; 280/752; 296/70; 381/86, 381/302; D14/204, 219
See application file for complete search history.

(56) References Cited

U.S. PATENT DOCUMENTS

| | | | | |
|---|---|---|---|---|
| 4,043,022 A * | 8/1977 | Kisuna et al. | ................. | 29/460 |
| 4,456,640 A | 6/1984 | Nishihara | | |
| 4,667,979 A * | 5/1987 | Wolff | ......................... | 280/752 |
| 4,668,004 A | 5/1987 | Tsunoda et al. | | |
| 4,720,867 A * | 1/1988 | Imai et al. | .................... | 381/86 |
| 5,285,501 A * | 2/1994 | Castillo | ....................... | 381/86 |
| 5,333,901 A * | 8/1994 | Barnes | ........................ | 280/732 |
| 5,487,800 A * | 1/1996 | Ash | ............................. | 156/87 |
| 5,565,659 A * | 10/1996 | Moner et al. | ................ | 181/150 |
| 5,577,770 A * | 11/1996 | Sinner et al. | ................. | 280/752 |
| 5,685,598 A * | 11/1997 | Inoue et al. | ................... | 296/72 |
| 5,857,726 A | 1/1999 | Yokoyama et al. | | |
| 6,258,438 B1 * | 7/2001 | Loveland et al. | ............ | 428/137 |
| 6,298,943 B1 * | 10/2001 | Yamada et al. | .............. | 181/156 |
| 6,457,739 B1 | 10/2002 | Dailey et al. | | |
| 6,644,685 B2 | 11/2003 | Sun et al. | | |
| D484,484 S * | 12/2003 | Green | ....................... | D14/204 |
| 6,669,273 B1 | 12/2003 | Glovatsky et al. | | |
| 6,786,524 B2 * | 9/2004 | Tamura | ................... | 296/37.12 |
| 6,854,783 B2 | 2/2005 | Teranishi et al. | | |
| 6,902,185 B2 * | 6/2005 | North | ...................... | 280/728.3 |
| 7,044,538 B2 * | 5/2006 | Stack | ......................... | 296/208 |
| 7,217,387 B2 * | 5/2007 | Evans | ........................ | 264/510 |
| 7,264,294 B2 | 9/2007 | Gresham et al. | | |
| 2002/0150274 A1 * | 10/2002 | Winget | ....................... | 381/391 |
| 2005/0253409 A1 * | 11/2005 | Sato et al. | ..................... | 296/70 |
| 2006/0127636 A1 | 6/2006 | Bondar et al. | | |
| 2006/0214462 A1 | 9/2006 | Cowelchuk et al. | | |
| 2008/0315612 A1 * | 12/2008 | D'Alessandro | .............. | 296/72 |
| 2009/0174213 A1 * | 7/2009 | Robertson | .................... | 296/70 |

FOREIGN PATENT DOCUMENTS

JP 59045270 A * 3/1984

* cited by examiner

*Primary Examiner*—Glenn Dayoan
*Assistant Examiner*—Paul A Chenevert
(74) *Attorney, Agent, or Firm*—Dinsmore & Shohl LLP

(57) ABSTRACT

An instrument panel for a vehicle includes an IP substrate and an IP skin with foam disposed there between. The instrument panel may include openings for receiving accessories. The IP skin material may extend into the opening. The portion of the skin material extending into the opening may include a opening datum. A cover for the opening in the instrument panel may include one or more datum ribs. When the cover is inserted in the opening in the instrument panel, the datum rib engages with the opening datum pushing the cover towards the instrument panel thereby improving the fit of the cover in the instrument panel.

17 Claims, 9 Drawing Sheets

COVERS FOR VEHICLE INSTRUMENT PANELS

TECHNICAL FIELD OF THE INVENTION

The present invention generally relates to vehicle instrument panels and, more specifically, to securing instrument panel covers to instrument panels.

BACKGROUND OF THE INVENTION

Instrument panels for vehicles are generally configured with a variety of openings that accommodate different finish options and accessories that may be selected by the consumer. An accessory may be installed in an opening of the instrument panel and a decorative bezel, accessory panel or accessory cover inserted in the opening to obscure the accessory attachment points and provide a transition between the surface of the instrument panel and the accessory. The decorative bezel, accessory panel or accessory cover is generally secured to the instrument panel using clips extending from the underside of the cover which connect with a corresponding fastener located in the opening in the instrument panel. When the opening in the vehicle instrument panel is completely surrounded by the instrument panel, the cover is prevented from moving and, as such, the clips remain engaged with the corresponding connectors in the opening in the instrument panel.

However, when an opening in an instrument panel is located along an edge or edges of the instrument panel, an instrument panel cover inserted into the opening may not be bound by the instrument panel along the entire perimeter of the opening. Under these conditions, the instrument panel cover may be free to move along the unbounded portion of the opening causing an undesirable gap between the instrument panel and the corresponding cover.

Accordingly, the need exists for a system of securing an instrument panel cover in the opening of an instrument panel where at least a portion of the perimeter of the opening is not bound.

SUMMARY OF THE INVENTION

In one embodiment, an instrument panel for a vehicle may include at least one opening recessed in the instrument panel with an opening datum positioned in the opening. The opening datum may have at least one contact surface. The instrument panel may also include a cover for the opening. The cover may include a top surface, an underside, and at least one datum rib extending from the underside of the cover. The at least one datum rib may include at least one contact surface. When the cover is positioned in the opening, the at least one contact surface of the datum rib engages with the at least one contact surface of the opening datum thereby positioning the cover in the opening such that the gap between and edge of the cover and a corresponding edge of the instrument panel is minimized.

In another embodiment, a system for securing a cover in an opening in a vehicle instrument panel may include a vehicle instrument panel having at least one opening having an unbounded side and at last one opening datum positioned in the opening. The system may also include a cover for the opening. The cover may include a top surface, an underside, and at least one datum rib extending from the underside of the cover. The at least one datum rib may include at least one contact surface. When the cover is inserted in the opening, the at least one contact surface of the datum rib engages with the at least one contact surface of the opening datum thereby positioning the cover in the opening such that a gap between an edge of the cover and a corresponding edge of the instrument panel is effectively eliminated.

In another embodiment, a method of assembling an instrument panel includes providing a vehicle instrument panel having at least one opening recessed in the instrument panel. The opening may be unbounded on at least one side and the opening may include at least one opening datum positioned in the opening. The at least one skin datum may have at least one contact surface. The method may also include providing a cover for the at least one opening, wherein the cover includes a top surface, an underside and at least one datum rib extending from the underside of the cover. The at least one datum rib comprises at least one contact surface and the at least one datum rib is positioned on the underside of the cover to engage with the at least one opening datum. The method may also include inserting the cover in the opening such that the at least one contact surface of the datum rib engages with the at least one contact surface of the opening datum thereby positioning the cover in the opening such that at least one gap between the edge of the cover and a corresponding edge of the instrument panel is minimized.

BRIEF DESCRIPTION OF THE DRAWINGS

The following description of the specific illustrative embodiments can be read in conjunction with the following drawings in which.

DETAILED DESCRIPTION OF THE ILLUSTRATIVE EMBODIMENTS

Figure 1:
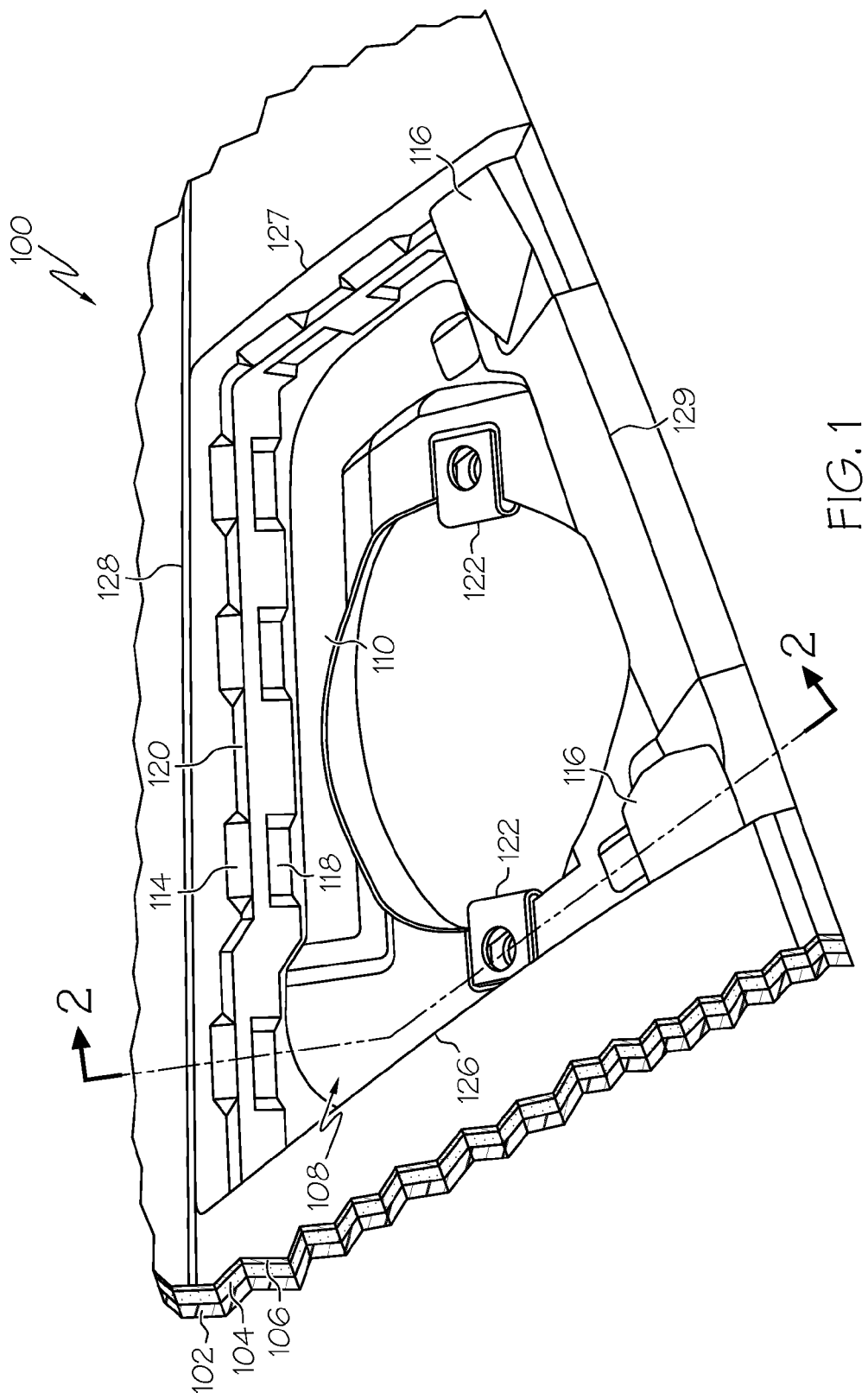
FIG. 1 depicts an instrument panel having an instrument panel skin according to one embodiment shown and described herein.
Figure 4A:
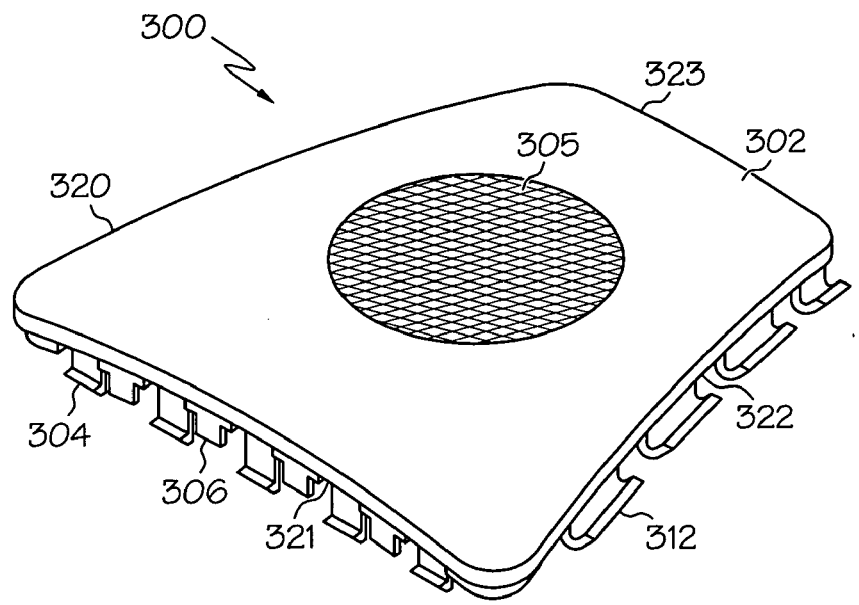
FIG. 4A and 4B depict the top surface and the underside of an instrument panel cover according to one embodiment shown and described herein.
Figure 4B:
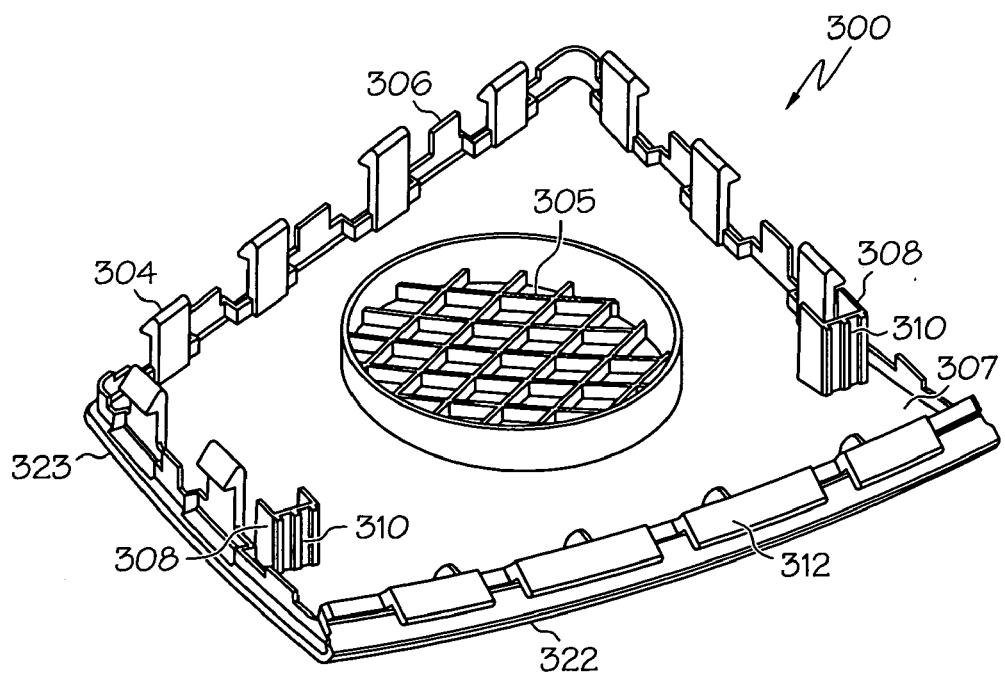

FIG. 1 shows an instrument panel for a vehicle according to one embodiment. The instrument panel may comprise features which, when used in conjunction with a corresponding cover, position, secure and improve the fit of the covers installed in the instrument panel. The instrument panel may generally comprise an instrument panel (IP) substrate, an IP skin, and a foam material disposed between the IP substrate and the IP skin. The instrument panel may also comprise one or more openings for receiving components and or accessories with at least one opening datum positioned in the opening. FIGS. 4A and 4B show a cover for use in conjunction with the instrument panel shown in FIG. 1. Similarly, as described herein, the cover may comprise features which, when used with corresponding features in a vehicle instrument panel, position, secure and improve the fit of the cover in an opening in the vehicle instrument panel. The cover may generally comprise a top surface, an underside and one or more datum ribs extending from the underside. Each of the elements of the instrument panel and cover and the interrelation between these elements will be described more fully herein.

Referring to FIG. 1, an instrument panel 100 for a vehicle according to one embodiment is shown. The instrument panel may comprise an IP substrate 102 covered by an IP skin material 106. A foam material 104 may be disposed between the IP skin 106 and the IP substrate 102. The IP substrate 102 may comprise metal, polymeric, or composite materials. The IP substrate 102 in the embodiment of the instrument panel shown and described herein is injection molded using a polymeric material such as polypropylene, acrylonitrile butadiene styrene (ABS) or a similar polymeric material as will be apparent to one skilled in the art. It should be understood that the IP substrate 102 may be produced by any suitable forming technique and that no particular limitation is intended as to the material from which the IP substrate 102 is constructed or the manner in which the IP substrate 102 is formed.

The IP skin 106 may comprise a flexible and pliable material such as leather or a plastic material. In the embodiments shown and described herein, the IP skin is a thermo-formable plastic material such a thermoplastic polyurethane, a thermoplastic olefin, poly vinyl chloride or similar materials as will be apparent to one skilled in the art. The IP skin 106 may be molded into the shape of the upper surface of the instrument panel 100 using molding and forming techniques as will be apparent to one skilled in the art. After molding and forming, the IP skin 106 remains flexible and pliable while generally conforming to the shape of the instrument panel 100, including any topographical features that may be present on the instrument panel. For example, as shown in FIG. 1, the IP skin 106 may be molded to include openings 108, wedges 114, recessed slots, 118, opening datums 116 and the like.

To construct the instrument panel, the IP skin 106 is oriented over the IP substrate 102 and a foam material is injected between the IP skin 106 and the IP substrate 102. The foam material may generally comprise a urethane foam. However, it should be understood that other foam materials may be used as will be apparent to one skilled in the art. The foam material fills the space between the IP skin 106 and the substrate 102 increasing the rigidity of the IP skin 106 while also bonding the IP skin 106 to the IP substrate 102. The foam 104 also provides structure and rigidity to the surface features molded into the IP skin 106 such as the opening 108, the wedges 114, recessed slots 118 and opening datums 116 shown in FIG. 1.

In the embodiment of the instrument panel 100 shown in FIG. 1, the instrument panel 100 may comprise one or more openings 108 for receiving various components and/or accessories such as speakers, audio/video accessories, HVAC accessories, meters, gages, and the like. The opening 108 may generally be recessed in the instrument panel 100 such that the opening 108 is bound by the instrument panel 100. In the embodiment of the instrument panel 100 shown in FIG. 1, the perimeter of the opening 108 is bound on three sides by edges 126, 127, 128 of the instrument panel 100. The fourth side of the opening 108 is defined by the edge 129 of the IP substrate 102 and is substantially unbounded.

Referring now to FIG. 1, the opening 108 in the instrument panel 100 may include supports 110 defined by the IP substrate 102 and attachment points 122 for supporting and attaching an accessory in the opening 108. In the embodiment of the instrument panel shown in FIG. 1, the opening 108 in the instrument panel is configured to receive an audio speaker (not shown). The opening 108 may also be formed with a standoff shelf 120 and a plurality of recessed slots 118 for engaging with clips 304 located on the underside of a cover 300, as will be described in more detail herein. The standoff shelf 120 may provide a horizontal datum on which standoff ribs 306 located on the underside of a cover 300 rest. The recessed slots 118 may be located around the perimeter of the opening 108 and positioned to receive a correspondingly positioned clip 304 located on the underside 307 of the cover 300. Each recessed slot 118 may be positioned proximate a wedge 114 such that the clip 304 must pass over the wedge 114 before engaging with the recessed slot 118. The wedges 114 assist in the engagement of the clip 304 with the recessed slot 118 and provide lateral support to the clips 304. It should be understood that, while FIG. 1 depicts the opening 108 as containing recessed slots 118 for engaging with the clips 304 located on the underside 307 of the cover 300, any suitable combination of fastener and corresponding connector may be used to secure the cover 300 in the opening 108 as will be apparent to one skilled in the art. This may include, without limitation, screws and corresponding screw holes, bolts and corresponding bolt holes, fin-type clips and corresponding holes, and the like.

In addition to the recessed slots 118, wedges 114 and other features contained in the opening 108 of the instrument panel 100, the opening 108 may also contain one or more opening datums 116 positioned on the IP substrate 102 proximate the unbound edge 129 of the opening 108. The opening datums 116 are formed in a similar manner as the instrument panel 100. Accordingly, the shape of the opening datums 116 is molded into the IP skin 106 and foam 104 is injected into the molded IP skin 106 to give the opening datum 116 structure and rigidity. The foam 104 also bonds the IP skin 106 to the IP substrate 102. In the embodiment shown in FIG. 1, the opening datums 116 are wedge-shaped to facilitate positioning on an inclined surface of the instrument panel substrate 106. However, it should be understood that the opening datums 116 may comprise any of a variety of geometrical configurations and that no particular limitation as to the shape of the opening datum 116 is intended.

While the opening datums 116 shown and discussed herein are depicted as being molded into the IP skin 106 and attached to the IP substrate 102, it will be understood that the opening datums 116 may be formed independent of the IP skin 106 and separately attached to the IP substrate 102. Alternatively, the opening datums 116 may be integrally formed with the IP substrate 102. When the opening datums 116 are integral with the IP substrate 102, the opening datums 116 may be covered with IP skin material and foam disposed between the IP skin and the IP substrate.

The opening datums 116 have a contact surface 124 for interfacing with a datum rib located on the underside of an cover 300 as will be discussed further herein. The opening datums 116 are oriented in the opening 108 such that the opening datum contact surface 124 opposes an edge of the instrument panel 100 located opposite an unbound edge of the opening 108. For example, as shown in FIG. 1, the unbounded side 129 of the opening 108 is located opposite the edge 128 of the instrument panel 100 bounding the opening 108. As such, the opening datums 116 are positioned in the opening 108 such that the opening datum contact surfaces 124 oppose the edge 128.

Figure 2:
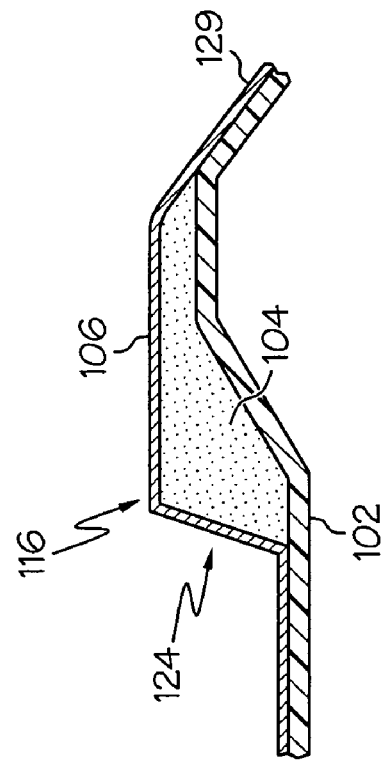
FIG. 2 depicts a cross sectional view of the instrument panel shown in FIG. 1.
Figure 2:
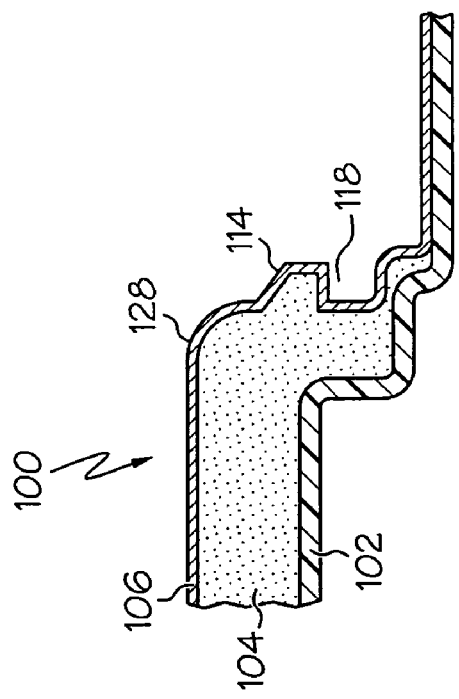
Figure 3:
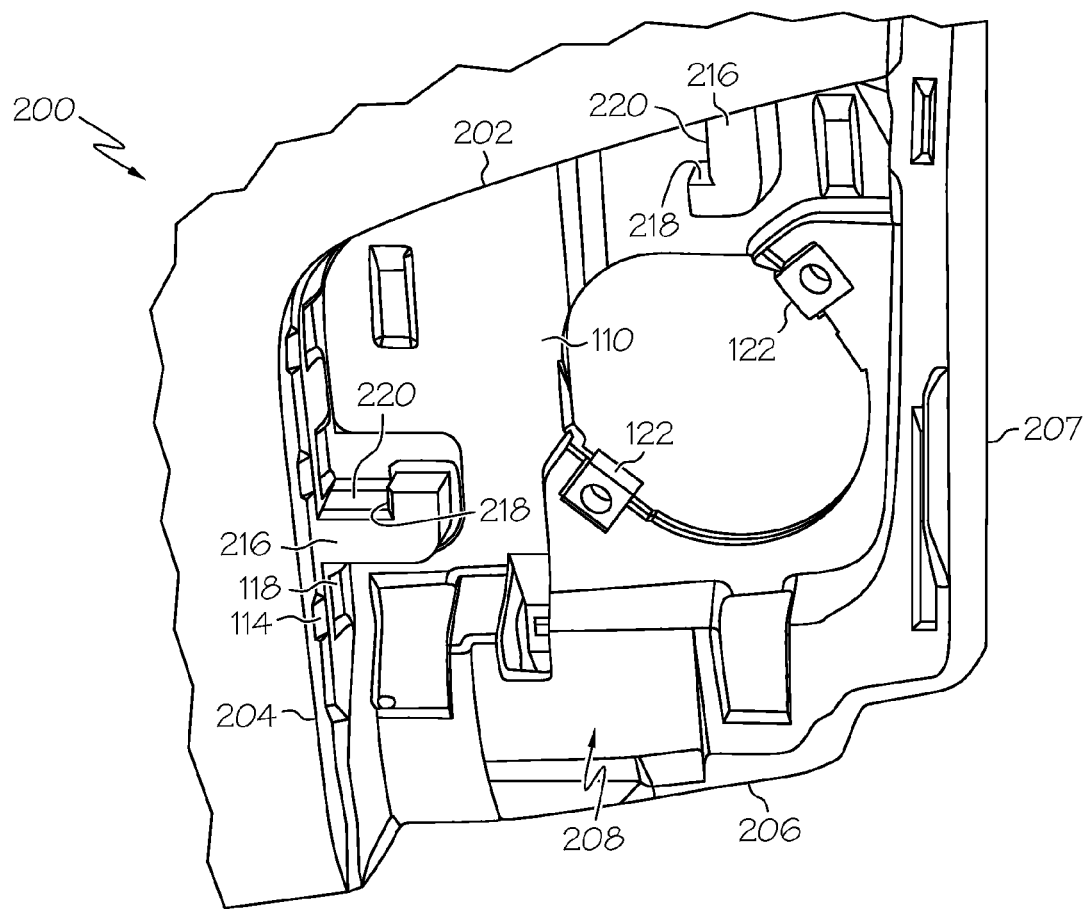
FIG. 3 depicts an instrument panel having an instrument panel skin according to one embodiment shown and described herein.

While the opening datums 116 shown in FIGS. 1 and 2 have a wedge-shaped configuration with one contact surface 124, it should be understood that the opening datums 116 may be of any suitable configuration and have multiple contact surfaces as will be apparent to one skilled in the art. For example, referring to the embodiment of a vehicle instrument panel 200 shown in FIG. 3, the instrument panel 200 has an opening 208. The perimeter of the opening 208 is bound on two sides by adjacent edges 202, 204 of the instrument panel 200. However, the perimeter of the opening 208 is unbounded along the remaining adjacent sides 206, 207. Where two adjacent sides of the opening are unbounded, multiple pairs of opening datums having a configuration similar to those shown in FIG. 1 may be positioned in the opening with each pair positioned opposite the one of the bound edges 202, 204. Alternatively, as shown in FIG. 3, a pair of L-shaped opening datums 216 may be positioned in the opening 208. The L-shaped opening datums 216 have contact surfaces 218, 220, one on each portion of the "L." The L-shaped configuration facilitates a single opening datum having multiple contact surfaces 218, 220 with each contact surface 218, 220 oriented in opposition to the adjacent edges 202, 204 of the instrument panel 200 bounding the opening 208.

In the embodiments of the instrument panels shown and described herein, the opening datums positioned in the openings of the instrument panel function as an edge or edges of the opening for purposes of positioning, securing and retaining an instrument panel cover in the opening when at least a portion of the perimeter of the opening is not bound by the instrument panel. To facilitate the positioning, securing and retention of an instrument panel cover in the opening, the opening datums are used in conjunction with features located on the underside of the instrument panel cover as will be discussed more fully herein.

Referring now to FIGS. 4A and 4B, a cover 300 for an opening 108 in a vehicle instrument panel 300 is shown. The cover 300 may comprise metal, composite, and/or polymeric materials. In the embodiments shown and described herein, the cover 300 is formed by injection molding a polymeric material such as polypropylene or acylonitrile butadiene styrene (ABS). However, other materials and forming processes may be used to form the cover 300 as will be apparent to one of ordinary skill in the art.

The cover 300 may comprise a top surface 302 and an underside 307. The cover 300 is generally shaped to correspond to the geometry of the opening 108 in the vehicle instrument panel 100 shown in FIG. 1. In the embodiment shown in FIGS. 4A and 4B, the top surface 302 and underside 307 may be bound by edges 320, 321, 322, 323 such that the cover 300 is generally polygonal in shape. However, it should be understood that, while the embodiment of the cover 300 shown in FIGS. 4A and 4B is depicted as a four sided polygon, the cover 300 of the present invention is not limited to any particular geometrical configuration and may be of any suitable geometry as may be defined by a single edge, such as a circle or oval, or multiple edges such as any regular or irregular polygon.

In one embodiment, at least a portion of the top surface 302 of the cover 300 may comprise a pattern such as a grid pattern, a honeycomb pattern or the like, such as when the cover 300 is intended for installation over an audio speaker. In the embodiment shown in FIG. 4A the cover 300 has a grid pattern 305. The grid pattern 305 may be integrally formed with the cover 300 or installed over an opening in the cover 300 after the cover is formed. Alternatively, the top surface 302 of the cover 300 may comprise a generally smooth finish or a grained finish.

The underside 307 of the cover 300 may comprise a plurality of clips 304, stand-off ribs 306 and hooks 312 to facilitate securing the cover 300 in an opening 108 of a vehicle instrument panel 100, as will be discussed further herein. The clips 304, stand off ribs 306 and hooks 312 may be integrally formed with the cover 300, such as when the cover 300, clips 304, stand off ribs 306, and hooks 312 are injection molded as a single piece, or the clips 304, stand off ribs 306 and hooks 312 may be attached to the cover 300 after the cover 300 has been formed. In the embodiments discussed and described herein, the clips 304, standoff ribs 306 and hooks 312 are integrally formed with the cover 300.

The clips 304, standoff ribs 306 and hooks 312 may be positioned proximate the edges 320, 321, 322, 323 and extend outward, away from and generally orthogonal to the underside 307 of the cover 300. In the embodiment of the cover 300 shown in FIGS. 4A and 4B, the clips 304 and standoff ribs 306 are positioned along the edges 320, 321, 323 that will be adjacent to the edges 126, 127, 128 of the instrument panel 100. The hooks 312 are positioned along the edge 322 of the cover 300 that corresponds to the unbounded edge 129 of the opening 108. The clips 304 may have a J-shaped configuration for engaging with a corresponding recessed slot 118 located in the opening 108 of the vehicle instrument panel 100. The standoff ribs 106 may have a regular geometrical configuration such as a rectangular or cylindrical post and serve as a support for the cover 300, as will be discussed in more detail herein. As shown in FIGS. 4A-4B, the standoff ribs 306 have a thin, rectangular configuration. The hooks 312 have an L-shaped configuration for receiving a corresponding rib of a finish panel that may be connected to the cover 300.

It should be understood that, while the clips 304 shown in FIGS. 4A and 4B have a generally J-shaped configuration, the clips 304 may be of any suitable configuration for attaching the cover 300 to a vehicle instrument panel 100 as may be apparent to one skilled in the art. Furthermore, it will also be apparent to one skilled in the art that, while the present invention recites the use of clips 304 to secure the cover 300 in an opening 108 in a vehicle instrument panel 100, other fasteners may be used to secure the cover 300 in the opening 108. For example, screws, bolts, fin-type clips and the like may be used to secure the cover 300 in the opening 108.

As shown in FIG. 4B, the underside 307 of the cover 300 may also contain at least one datum rib 308 extending from the underside 307 of the cover 300. When the cover 300 is inserted into the opening 108 in the instrument panel 100, the datum rib 308 interfaces with an opening datum 116 positioned in the opening 108 thereby positioning and securing the cover 300 in the opening 108 as will be discussed further herein. In the embodiment of the cover 300 shown in FIG. 4A, the cover 300 has two datum ribs 308 extending from the underside 307 of the cover 300 such that the datum ribs 308 are substantially orthogonal to the underside 307 of the cover. The datum ribs 308 may be integrally formed with the cover 300, such as when the cover 300 and datum ribs 308 are injection molded as a single piece. Alternatively, the datum ribs 308 may be attached to the cover 300 after the cover 300 has been formed. Each datum rib 308 has a generally square, U-shaped configuration with at least one contact surface 310 for contacting the opening datums 116. The contact surface 310 of the datum ribs 308 may be ridged to provide a greater contact area between the datum ribs 308 and the opening datums 116. While the datum ribs 308 are depicted in FIG. 4B as having a generally square, U-shaped configuration, the datum ribs 308 may be of any suitable geometrical configuration as will be apparent to one of skill in the art. For example, the datum ribs shown in FIG. 4B may have a generally L-shaped configuration with at least one contact surface. The datum ribs 308 may be of sufficient length in the direction extending away from the underside 307 of the cover 300 such that the datum ribs 308 may engage with the opening datums 116 positioned in the opening 108 of the instrument panel 100.

Figure 5A:
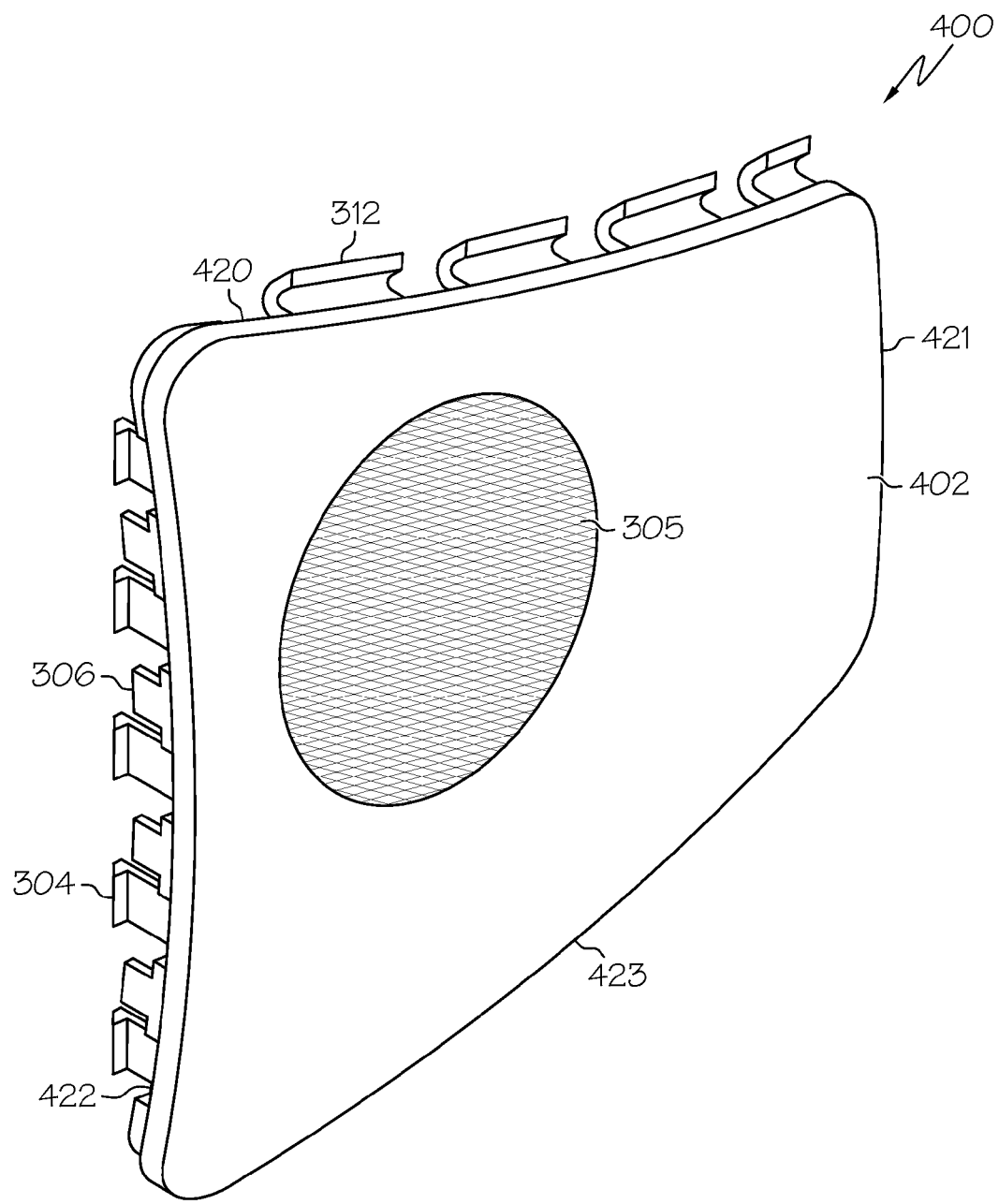
FIGS. 5A and 5B depict the top surface and the underside of an instrument panel cover according to one embodiment shown and described herein.
Figure 5B:
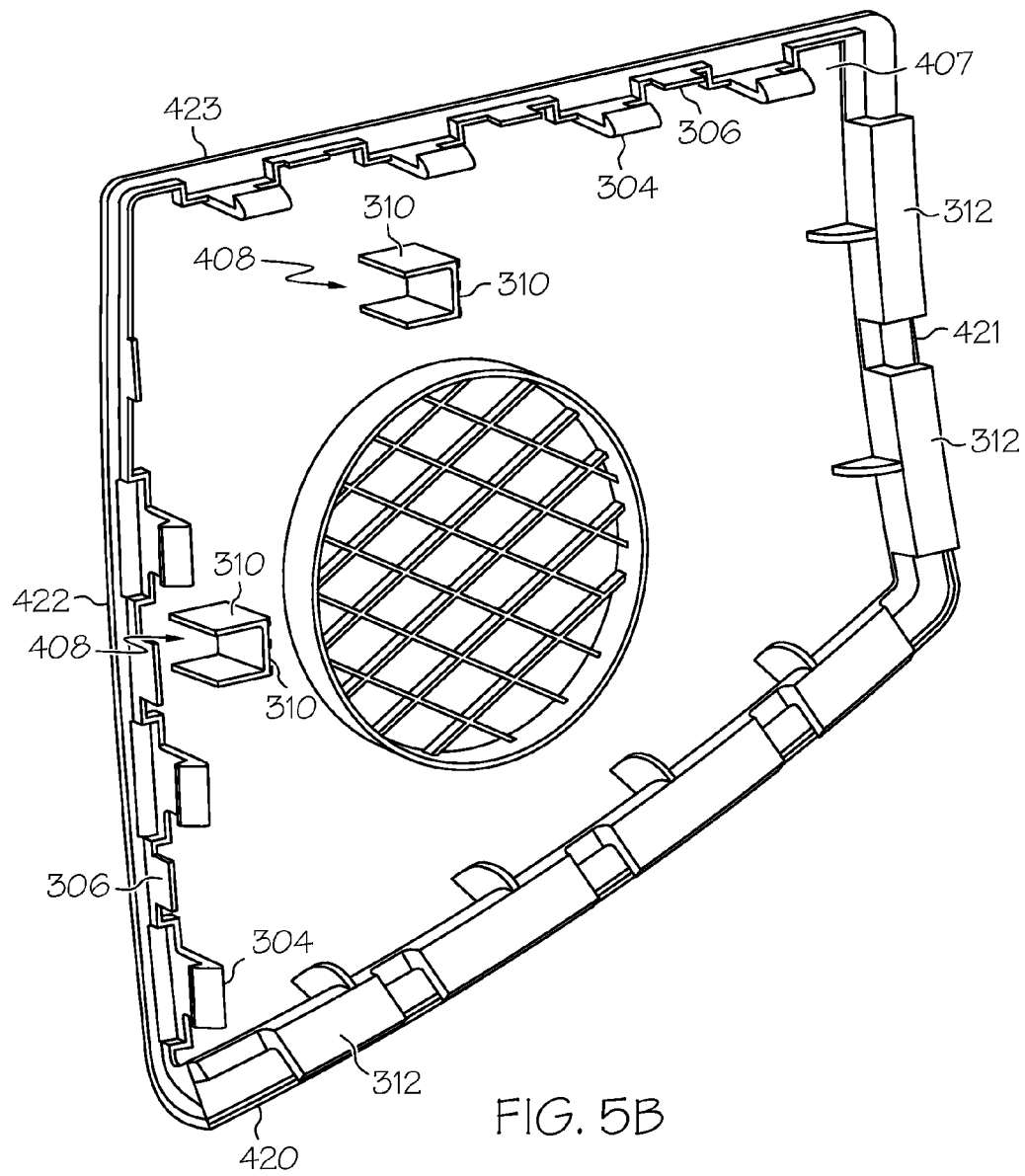

Referring now to FIGS. 5A and 5B, another embodiment of a cover 400 for a vehicle instrument panel is illustrated. The cover 400 has a top surface 402 and is configured for insertion in an opening in a vehicle instrument panel such as the opening 208 in the vehicle instrument panel 200 depicted in FIG. 3. The cover 400 may be a multi-sided polygon comprising four edges 420, 421, 422, 423. The edges 422 and 423 of the cover 400 correspond to the edges 202, 204 of the opening 208 bound by the instrument panel 200. Accordingly, the cover 400 has clips 304 and ribs 306 positioned proximate the edges 422, 423 such that cover 400 may be secured in the opening 208 by engaging the clips 304 wit the corresponding recessed slots 118 in the opening 208 and positioning the standoff ribs 306 on the standoff shelf 120. The edges 420 and 421 of the cover 400 correspond to the edges 206, 207 of the opening 208 not bounded by the instrument panel 200. As such, the cover 400 has hooks 312 positioned proximate the edges 420, 421 such that finish panels (not shown) may be connected to the cover 400.

As shown in FIG. 5B, the underside 407 of the cover 400 may also contain at least one datum rib 408 extending from the underside 407 of the cover 400. When the cover 400 is inserted into the opening 208 in the instrument panel 200, the datum rib 408 interfaces with the opening datum 216 positioned in the opening 208 thereby positioning and securing the cover 400 in the opening 208 as will be discussed further herein. In the embodiment of the cover 400 shown in FIG. 5B, the cover 400 has two datum ribs 408 extending from the underside 407 of the cover 400 such that the datum ribs 408 are substantially orthogonal to the underside 407 of the cover. Each datum rib 408 has a generally square, U-shaped configuration with at least two contact surfaces 310 for contacting at least two surfaces of the L-shaped opening datums 216 located in the opening 208 of the instrument panel 200. The contact surfaces 310 of the datum ribs 408 may be ridged or corrugated to provide a greater contact between the datum ribs 408 and the L-shaped opening datums 216. While the datum ribs 408 are depicted as having a generally square, U-shaped configuration, the datum ribs 408 may be of any suitable geometrical configuration as will be apparent to one of skill in the art. For example, the datum ribs shown in FIG. 5B may have a generally L-shaped configuration with each portion of the L forming a contact surface 310. The datum ribs 408 may be of sufficient length in the direction extending away from the underside 407 of the cover 400 such that the datum ribs 408 may engage with the opening datums 216 positioned in the opening 208 of the instrument panel 200.

Referring to the instrument panel covers 300,400 shown in FIGS. 4A-5B, it should now be understood that the covers described herein may have at least one datum rib extending from the underside of the cover a distance sufficient to contact a opening datum positioned in an opening of a vehicle instrument panel in which the cover is to be installed. The datum rib facilitates positioning and securing the cover in the opening. The location, configuration and number of datum ribs may vary depending on the configuration of the opening. For example, as shown in FIG. 1, when the opening 108 in the instrument panel is configured such that the instrument panel surrounds the opening 108 on three sides, opening datums 116 may be positioned proximate the unbounded side. As such, the corresponding cover 300 for the opening has two datum ribs 308 positioned to engage the opening datums 116 along the unbounded edge. Accordingly, instrument panel openings of various configurations may necessitate covers having differently configured and positioned datum ribs extending from the underside of the cover.

Figure 6:
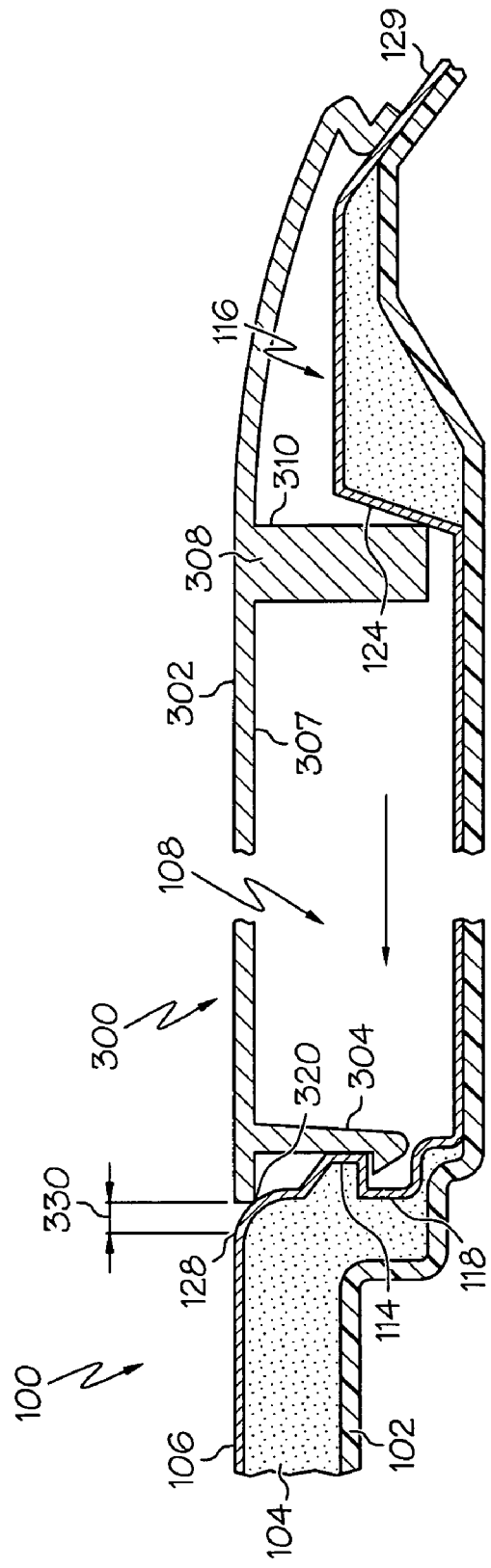
FIG. 6 depicts a cross sectional view of an instrument panel cover installed in an instrument panel having an instrument panel skin according to one embodiment shown and described herein.

Referring now to FIG. 6, a cover 300 installed in the opening 108 of an instrument panel 100 is shown in cross section. In this embodiment the datum rib 308 is used in conjunction with a opening datum 116 to position and secure the cover 300 when the opening 108 in the instrument panel 100 is bounded on only 3 sides. When the cover 300 is installed in the opening 108, the clips 304 extending from the underside 307 of the cover 300 engage with the corresponding recessed slot 118 in the opening 108 thereby securing the cover 300 in the instrument panel 100. The datum rib 308 extending from the underside 307 of the cover 300 engages with the opening datum 116 positioned in the opening 108 such that the contact surface 124 of the opening datum 116 pushes against the contact surface 310 of the datum rib 308. The opening datum 116 pushes against the datum rib 308 thereby preventing the cover 300 from moving towards the unbounded edge 129 of the opening 108. Because the cover cannot move towards the edge 129, the clips 304 remain engaged with the corresponding recessed slots thereby keeping the cover 300 secured in the opening 108.

Further, the opening datums 116 may also improve the fit of the cover 300 with respect to the instrument panel 100. More specifically, the opening datums 116 can be positioned in the opening 108 such that the opening datums 116 press against the datum ribs 308 of the cover 300 thereby forcing the cover 300 against the edge 128 of the instrument panel thereby minimizing or effectively eliminating the gap 330 between the edge 320 of the cover 300 and the edge 128 of the opening 108. It should be understood that, when the gap 330 between the edge 320 of the cover 300 and the edge 128 of the opening 108 is effectively eliminated, the edge 320 of the cover 300 abuts against the corresponding edge 128 of the opening 108 such that there is zero clearance between the edge 320 of the cover 300 and the corresponding edge 128 of the opening 108.

Figure 7:
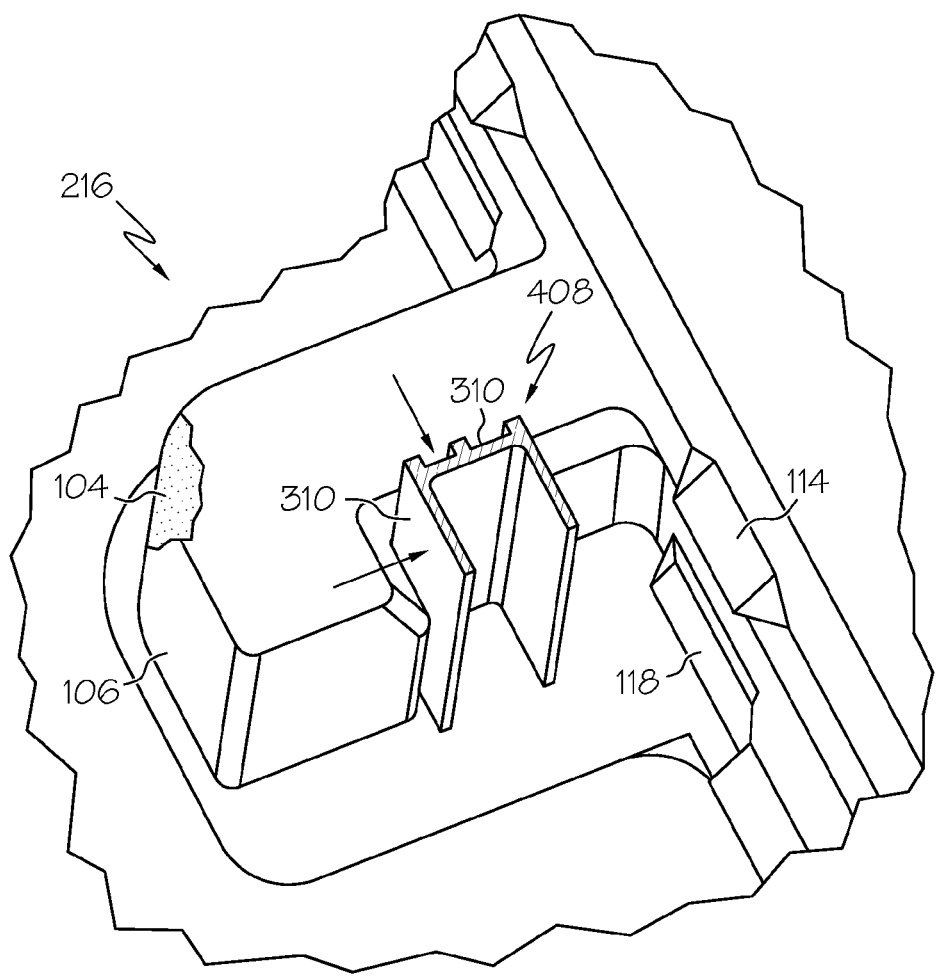
FIG. 7 depicts a perspective view of a datum rib and opening datum according to embodiments shown and described herein.
Figure 8:
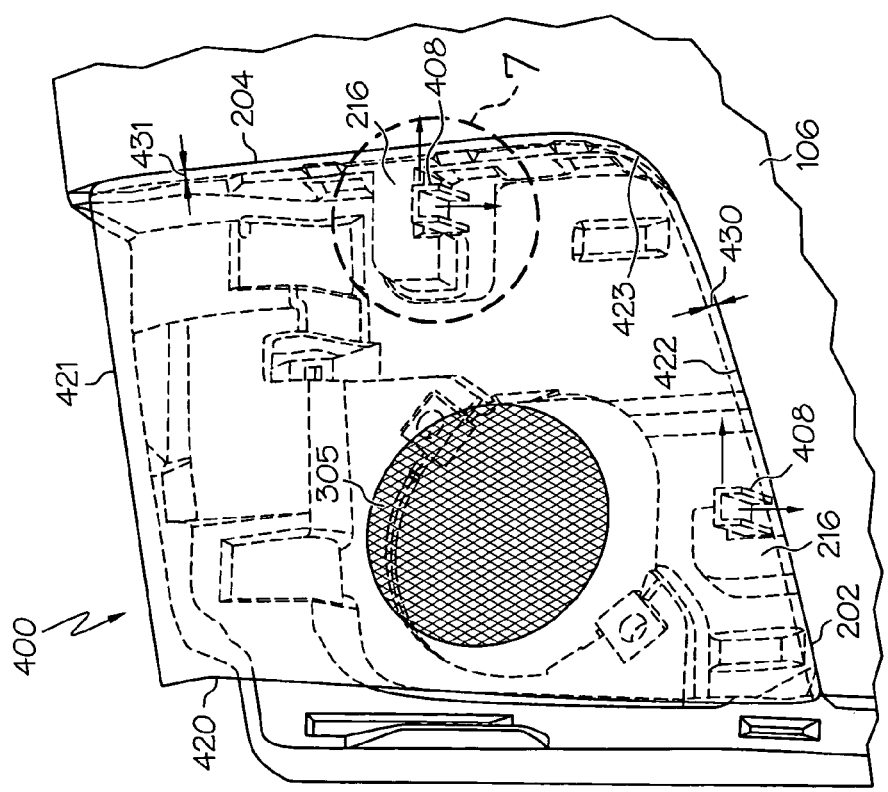
FIG. 8 depicts a perspective view of an instrument panel cover installed in an instrument panel according to one embodiment shown and described herein.

FIGS. 7 and 8 depict another embodiment in which the cover 400 shown in FIGS. 5A and 5B is inserted in the opening 208 in the instrument panel 200 shown in FIG. 3. More specifically, FIGS. 7 and 8 depict another embodiment in which a pair of L-shaped opening datums 216 are used in conjunction with datum ribs 408 to secure the instrument panel cover 400 of FIGS. 5A and 5B in the opening 208 in an instrument panel 200 shown in FIG. 3. It should be understood that the cover 400 shown in FIG. 8 is depicted as partially transparent for illustrative purposes and that the cover 400 may be solid, grill-like, or a combination thereof as will be apparent to one skilled in the art. When the cover 400 is inserted into the opening 208 the datum ribs 408 positioned on the underside 407 of the cover 400 engage with the L-shaped opening datums 216 located in the opening 208. The datum ribs 408 engage with the L-shaped opening datums 216 such that each opening datum 216 wraps around the respective datum rib 408 with each contact surface 310 of the datum rib 408 engaging with a different contact surface 218, 220 of each opening datum 216 as shown in FIG. 7.

When the datum ribs 408 engage with the L-shaped opening datums 216, the opening datums 216 push against the datum ribs 408 forcing the cover towards the adjacent edges 202,204 of the opening 208 preventing the cover from moving towards the unbounded adjacent edges 206,207. Accordingly, the L-shaped opening datums 216 prevent the clips 304 located on the underside of the cover 400 from becoming disengaged from the corresponding recessed slots 118. As such, the cover 400 remains secured in the opening 208.

The L-shaped opening datums 216 shown in FIGS. 7 and 8 may also be utilized to position the cover 400 in the opening 208 such that, when the datum ribs 408 of the cover 400 are engaged with the opening datums 216 of the opening 208, the adjacent edges 422, 423 of the cover 400 abut against the adjacent edges 202, 204 of the instrument panel 200 thereby reducing or effectively eliminating the gaps 430, 431 between the cover 400 and the instrument panel 200. As such, the opening datums 216 and corresponding datum ribs 408 located on the underside 407 of an instrument panel cover 400 may be used to improve the fit of the cover 400 in an opening 208 in and instrument panel 200.

As shown in FIG. 7, when the cover 400 is seated in the opening 208 such that the datum ribs 408 are engaged with the corresponding opening datums 216, the clips 304 are engaged with the recessed slots 118 located in the opening 108. Further, as shown in FIG. 7, when the clips 304 are engaged with the recessed slots 118 in the opening 208, the clips 304 act as a horizontal datum and prevent the cover 400 from being withdrawn from the opening 208. Similarly, when the cover 400 is properly positioned in the opening 208 using the datum ribs 408 in conjunction with the opening datums 216, the standoff ribs 306 on the underside 407 of the cover 400 rest on the standoff shelf 120. In this position, the standoff ribs 306 act as a horizontal datum and keep the cover 400 from being inserted further into the opening 208. Accordingly, the datum ribs 408 and opening datums 216 may be used to position the cover 400 in the opening 208 such that the clips 304 and standoff ribs 306 secure the cover 400 in the opening 208 and prevent the cover 400 from being withdrawn or inserted further into the opening 208. It should be understood that the clips 304 and standoff ribs 306 located on the underside of the cover 300 depicted in FIGS. 4A and 4B may be used in a similar manner as the clips 304 and standoff ribs 306 located on the underside of the cover 400.

It should now be understood that instrument panel with opening datums may be used in conjunction with an instrument panel cover having datum ribs to position and secure the instrument panel cover in an opening in an instrument panel where the opening is unbounded along one or more edges. Further, the opening datums and datum ribs discussed and described herein may also be used to improve the fit of an instrument panel cover in an opening in an instrument panel. Accordingly, it should be understood that the opening datums and datum ribs in a variety of configurations of the present invention may be used in conjunction with openings in instrument panels of various sizes and configurations and that the entire perimeter of such openings may be completely bound by the instrument panel or may have a portion of the perimeter unbounded.

Further, specific reference has been made herein to the use of the opening datums and datum ribs in conjunction with vehicle instrument panels. However, it should be understood that the opening datums and datum ribs discussed and described herein may be used with a variety of finish and/or trim panels used in vehicles, appliances, electronics and the like.

While particular embodiments and aspects of the present invention have been illustrated and described herein, various other changes and modifications can be made without departing from the spirit and scope of the invention. Moreover, although various inventive aspects have been described, such aspects need not be utilized in combination. It is therefore intended that the appended claims cover all such changes and modifications that are within the scope of this invention.

What is claimed is:

1. An instrument panel for a vehicle comprising:
at least one opening recessed in the instrument panel, the opening having at least one opening datum positioned in the opening, the opening datum having at least one contact surface;
wherein the opening is configured to receive a cover comprising a top surface, an underside, and at least one datum rib extending from the underside of the cover, and a plurality of connectors extending substantially orthogonally from the underside of the cover and configured to engage with corresponding connectors located in the opening of the instrument panel, wherein the at least one datum rib comprises at least one contact surface and the at least one datum rib is positioned on the underside of the cover to engage with the at least one opening datum when the cover is positioned in the;
wherein the at least one opening comprises at least one unbounded side and the at least one opening datum is positioned such that the at least one contact surface is substantially opposed to an edge of the instrument panel opposite the at least one unbounded side of the opening; and
wherein, when the cover is inserted into the at least one opening in the instrument panel, the at least one contact surface of the at least one opening datum engages with the at least one contact surface of the at least one datum rib pushing the cover towards the edge of the instrument panel opposite the unbounded side of the opening thereby minimizing the gap between the edge of the instrument panel opposite the unbounded side of the opening and the corresponding edge of the cover and securing the cover in the opening.

2. The instrument panel of claim 1 wherein the instrument panel comprises an instrument panel substrate, an instrument panel skin, and a foam material, wherein the instrument panel skin is attached to the instrument panel substrate with the foam material disposed between the instrument panel substrate and the instrument panel skin.

3. The instrument panel of claim 1 wherein the cover further comprises a plurality of standoff ribs extending substantially orthogonally from the underside of the cover, wherein the standoff ribs are configured to rest on a standoff shelf positioned in the opening of the vehicle instrument panel such that, when the cover is inserted in the opening of the vehicle instrument panel, the standoff ribs resting on the standoff shelf provide a horizontal datum preventing the cover from being further inserted into the opening.

4. The instrument panel of claim 1 wherein the at least one opening comprises a first unbounded side and a second unbounded side, wherein the first unbounded side and the second unbounded side are adjacent to one another;
the opening comprises a first opening datum and a second opening datum, each of the first opening datum and second opening datum comprising a first contact surface and a second contact surface, wherein the first contact surface of each of the first opening datum and the second opening datum is opposed to an edge of the instrument panel opposite the first unbounded side of the opening and the second contact surface of each of the first opening datum and the second opening datum is opposed to an edge of the instrument panel opposite the second unbounded side of the opening; and
the cover comprises a first datum rib and a second datum rib, each of the first datum rib and the second datum rib comprising a first contact surface and a second contact surface;

wherein, when the cover is inserted into the opening in the instrument panel, the first and second contact surfaces of the first datum rib engage with corresponding contact surfaces of the first opening datum and the first and second contact surfaces of the second datum rib engage with corresponding contact surfaces of the second opening datum such that the cover is pushed towards the edges of the instrument panel opposite the first unbounded side of the opening and the second unbounded side of the opening thereby minimizing gaps between the edges of the instrument panel opposite the first unbounded side and the second unbounded side and corresponding edges of the cover.

5. The instrument panel of claim 4 wherein each of the first opening datum and second opening datum are substantially L-shaped and the first contact surface and second contact surface of each opening datum are positioned on different portions of the first opening datum and the second opening datum.

6. A system for securing a cover in an opening in a vehicle instrument panel comprising:
   a vehicle instrument panel having at least one opening recessed in the instrument panel, the opening comprising:
      at least one unbounded side; and
      at least one opening datum positioned in the at least one opening, the at least one opening datum having at least one contact surface, wherein the at least one opening datum is oriented such that the at least one contact surface is substantially opposed to an edge of the instrument panel opposite the at least one unbounded side of the opening;
   a cover for the at least one opening, the cover comprising a top surface, an underside and at least one datum rib extending from the underside of the cover, wherein the at least one datum rib comprises at least one contact surface and the at least one datum rib is positioned on the underside of the cover to engage with the at least one opening datum when the cover is positioned in the opening;
   wherein, when the cover is inserted in the opening, the at least one contact surface of the datum rib engages with the at least one contact surface of the opening datum thereby positioning the cover in the opening such that a gap between an edge of the cover and an edge of the instrument panel opposite the at least one unbounded side of the opening is effectively eliminated.

7. The instrument panel of claim 6 wherein the cover further comprises:
   a plurality of connectors extending substantially orthogonally from the underside of the cover and configured to engage with corresponding connectors located in the opening of the instrument panel wherein, when the connectors are engaged with the corresponding connectors positioned in the opening of the instrument panel, the connectors provide a horizontal datum preventing the cover from being withdrawn from the opening; and
   a plurality of standoff ribs extending substantially orthogonally from the underside of the cover, wherein the standoff ribs are configured to rest on a standoff shelf positioned in the opening of the vehicle instrument panel such that, when the cover is inserted in the opening of the vehicle instrument panel, the standoff ribs resting on the standoff shelf provide a horizontal datum preventing the cover from being further inserted into the opening.

8. The instrument panel of claim 6 wherein the instrument panel comprises an instrument panel substrate, an instrument panel skin, and a foam material, wherein the instrument panel skin is attached to the instrument panel substrate with the foam material disposed between the instrument panel substrate and the instrument panel skin and the opening is positioned along at least one edge of the instrument panel substrate such that the at least one unbounded side of the opening is coextensive with at least one edge of the instrument panel substrate.

9. The system of claim 6 wherein the at least one opening comprises a first unbounded side and a second unbounded side, wherein the first unbounded side and the second unbounded side are adjacent to one another;
   the opening comprises a first opening datum and a second opening datum, each of the first opening datum and second opening datum comprising a first contact surface and a second contact surface, wherein the first contact surface of each of the first opening datum and the second opening datum is opposed to an edge of the instrument panel opposite the first unbounded side of the opening and the second contact surface of each of the first opening datum and the second opening datum is opposed to an edge of the instrument panel opposite the second unbounded side of the opening; and
   the cover comprises a first datum rib and a second datum rib, each of the first datum rib and the second datum rib comprising a first contact surface and a second contact surface;
   wherein, when the cover is inserted into the opening in the instrument panel, the first and second contact surfaces of the first datum rib engage with corresponding contact surfaces of the first opening datum and the first and second contact surfaces of the second datum rib engage with corresponding contact surfaces of the second opening datum such that the cover is pushed towards the edges of the instrument panel opposite the first unbounded side of the opening and the second unbounded side of the opening thereby effectively eliminating gaps between the edges of the instrument panel opposite the first unbounded side and the second unbounded side and corresponding edges of the cover.

10. The system of claim 9 wherein the first contact surface of the first opening datum is substantially orthogonal to the second contact surface of the first opening datum and the first contact surface of the second opening datum is substantially orthogonal to the second contact surface of the second opening datum.

11. The system of claim 9 wherein the edge of the instrument panel opposite the first unbounded side of the opening is adjacent the edge of the instrument panel opposite the second unbounded side of the opening.

12. A method of assembling an instrument panel for a vehicle comprising:
   providing a vehicle instrument panel having at least one opening recessed in the instrument panel, the at least one opening comprising:
      at least one unbounded side; and
      at least one opening datum positioned in the at least one opening, the at least one opening datum having at least one contact surface, wherein the at least one opening datum is oriented such that the at least one contact surface is substantially opposed to an edge of the instrument panel opposite the at least one unbounded side of the opening;
   providing a cover for the at least one opening, the cover comprising a top surface, an underside and at least one datum rib extending from the underside of the cover, wherein the at least one datum rib comprises at least one contact surface and the at least one datum rib is positioned on the underside of the cover to engage with the at least one opening datum when the cover is positioned in the opening;

inserting the cover in the opening such that the at least one contact surface of the datum rib engages with the at least one contact surface of the opening datum thereby positioning the cover in the opening such that at least one gap between an edge of the cover and a corresponding edge of the instrument panel opposite the at least one unbounded side of the opening is minimized.

13. The method of claim 12 wherein inserting the cover in the at least one opening effectively eliminates at least one gap between an edge of the cover and a corresponding edge of the instrument panel.

14. The method of claim 12 wherein inserting the cover in the opening effectively eliminates the gap between the edge of the cover opposite the at least one unbounded side of the opening and a corresponding edge of the instrument panel.

15. The method of claim 12 wherein the at least one opening comprises a first unbounded side and a second unbounded side, wherein the first unbounded side and the second unbounded side are adjacent to one another;

the at least one skin datum comprises a first contact surface and a second contact surface, and the at least one skin datum is oriented such that the first contact surface is substantially opposed to an edge of the instrument panel opposite the first unbounded side of the opening and the second contact surface is substantially opposed to an edge of the instrument panel opposite the second unbounded side of the opening; and the at least one rib datum comprises a first contact surface and a second contact surface;

wherein inserting the cover in the opening engages the first contact surface of the at least one rib datum with the first contact surface of the at least one opening datum and engages the second contact surface of the at least one rib datum with the second contact surface of the at least one opening datum thereby positioning the cover in the opening and minimizing the gap between the edge of the instrument panel opposite the first unbounded side and a corresponding edge of the cover is and minimizing the gap between the edge of the instrument panel opposite the second unbounded side and a corresponding edge of the cover.

16. The method of claim 15 wherein inserting the cover in the opening effectively eliminates the gap between the edge of the instrument panel opposite the first unbounded side and a corresponding edge of the cover and effectively eliminates the gap between the edge of the instrument panel opposite the second unbounded side and a corresponding edge of the cover.

17. The method of claim 15 wherein the edge of the instrument panel opposite the first unbounded side and the edge of the instrument panel opposite the second unbounded side are adjacent to one another.

* * * * *

UNITED STATES PATENT AND TRADEMARK OFFICE
CERTIFICATE OF CORRECTION

| | | |
|---|---|---|
| PATENT NO. | : 7,815,237 B2 | Page 1 of 1 |
| APPLICATION NO. | : 11/971317 | |
| DATED | : October 19, 2010 | |
| INVENTOR(S) | : Winston Robertson | |

It is certified that error appears in the above-identified patent and that said Letters Patent is hereby corrected as shown below:

Claim 1, line 17, insert --opening-- after --cover is positioned in the--.

Signed and Sealed this
First Day of February, 2011

David J. Kappos
*Director of the United States Patent and Trademark Office*

UNITED STATES PATENT AND TRADEMARK OFFICE
CERTIFICATE OF CORRECTION

PATENT NO.        : 7,815,237 B2                                               Page 1 of 1
APPLICATION NO.   : 11/971317
DATED             : October 19, 2010
INVENTOR(S)       : Winston Robertson It is certified that error appears in the above-identified patent and that said Letters Patent is hereby corrected as shown below:

Claim 1, Column 10, line 17, insert --opening-- after --cover is positioned in the--.

This certificate supersedes the Certificate of Correction issued February 1, 2011.

Signed and Sealed this
First Day of March, 2011

David J. Kappos
*Director of the United States Patent and Trademark Office*